United States Patent
Yasui et al.

(10) Patent No.: US 7,985,932 B2
(45) Date of Patent: Jul. 26, 2011

(54) DOOR LOCK DEVICE WITH SAFETY SWITCH

(75) Inventors: Takeo Yasui, Osaka (JP); Masaki Nobuhiro, Osaka (JP); Norifumi Obata, Osaka (JP); Takafumi Hidaka, Osaka (JP); Kiyo Hidaka, legal representative, Higashi-Morokata-gun (JP)

(73) Assignee: IDEC Corporation, Osaka (JP)

(*) Notice: Subject to any disclaimer, the term of this patent is extended or adjusted under 35 U.S.C. 154(b) by 734 days.

(21) Appl. No.: 11/988,857

(22) PCT Filed: Jul. 7, 2006

(86) PCT No.: PCT/JP2006/313571
§ 371 (c)(1),
(2), (4) Date: Jan. 14, 2008

(87) PCT Pub. No.: WO2007/007667
PCT Pub. Date: Jan. 18, 2007

(65) Prior Publication Data
US 2010/0095719 A1    Apr. 22, 2010

(30) Foreign Application Priority Data

Jul. 13, 2005 (JP) ................................. 2005-204236

(51) Int. Cl.
*H01H 27/00* (2006.01)
(52) U.S. Cl. ................................... 200/43.04; 200/334
(58) Field of Classification Search .................. 200/43.04
See application file for complete search history.

(56) References Cited

U.S. PATENT DOCUMENTS

| | | | | |
|---|---|---|---|---|
| 3,924,085 | A | * | 12/1975 | Stone ........................ 200/61.62 |
| 4,101,750 | A | * | 7/1978 | Doner ........................... 219/724 |
| 4,764,648 | A | * | 8/1988 | Resh ........................... 200/50.1 |
| 6,310,305 | B1 | | 10/2001 | Kamino et al. |
| 6,660,949 | B2 | | 12/2003 | Kamino et al. |

FOREIGN PATENT DOCUMENTS

| | | |
|---|---|---|
| JP | 53-96480 | 8/1978 |
| JP | 55-33128 | 8/1980 |
| JP | 10-196174 | 7/1998 |
| JP | 2000-207979 | 7/2000 |
| JP | 2001-184988 | 7/2001 |
| JP | 2002-201840 | 7/2002 |
| JP | 2002-309811 | 10/2002 |
| JP | 2004-353849 | 12/2004 |

* cited by examiner

*Primary Examiner* — Edwin A. Leon
*Assistant Examiner* — Lheiren Mae Caroc
(74) *Attorney, Agent, or Firm* — Jordan and Hamburg LLP

(57) ABSTRACT

A door lock apparatus with safety switch capable of locking a door. A coupling member is pivotally moved about a pivotal shaft by a closing operation by a rotary handle, thereby bringing an engaging portion thereof into engagement with a fixing member, so that a protective door is inhibited from moving in two directions of arrows X, Y including a moving direction of the door. Whether the door is of a slide or pivot type, the door is assuredly locked in a closed state because the door is inhibited from moving in the two directions including the moving direction thereof. If an operation mistake is made to open the door, the force for opening the door is not directly applied to the switch body or the actuator. A safety switch may achieve an increase in durability.

6 Claims, 10 Drawing Sheets

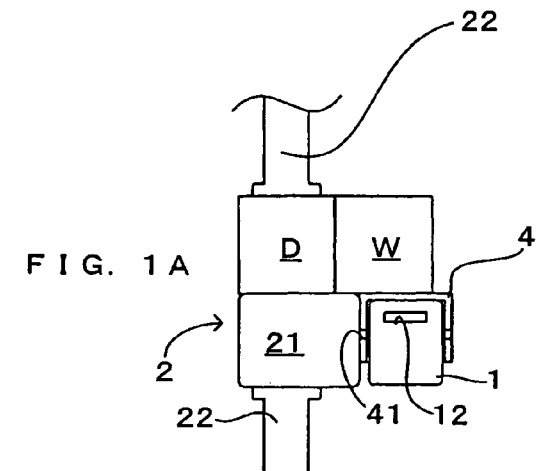
FIG. 1A
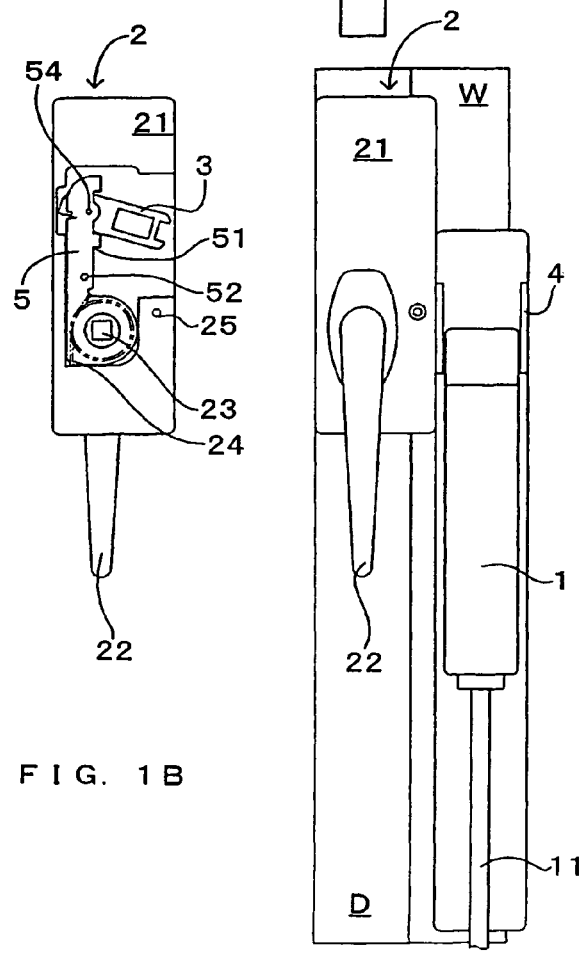
FIG. 1B
FIG. 1C
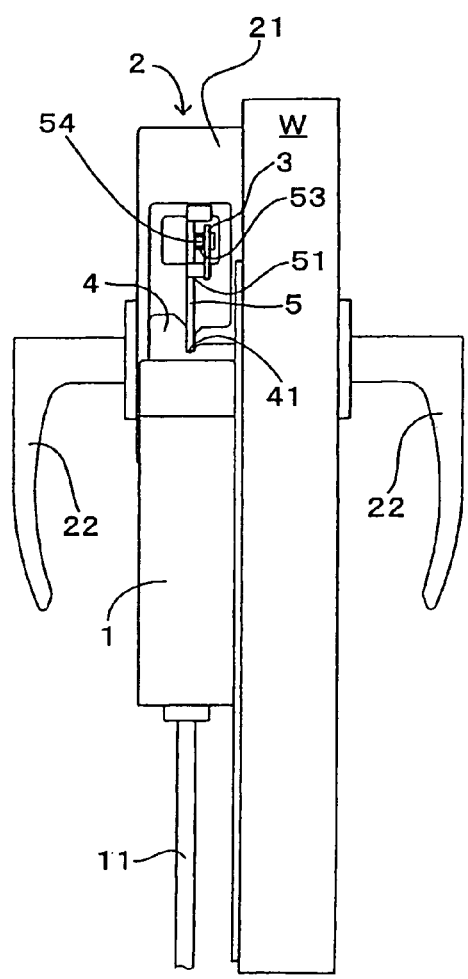
FIG. 1D

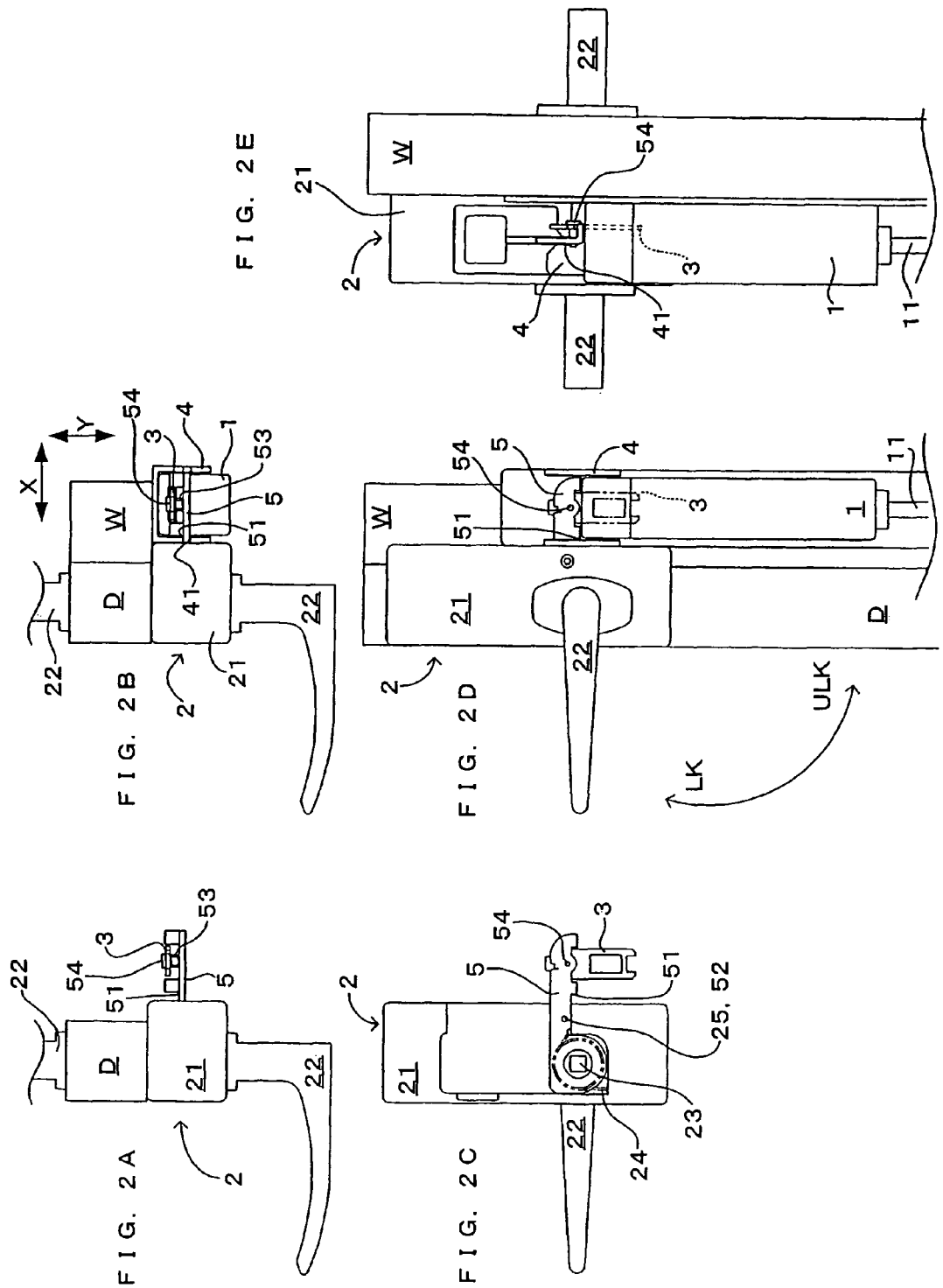

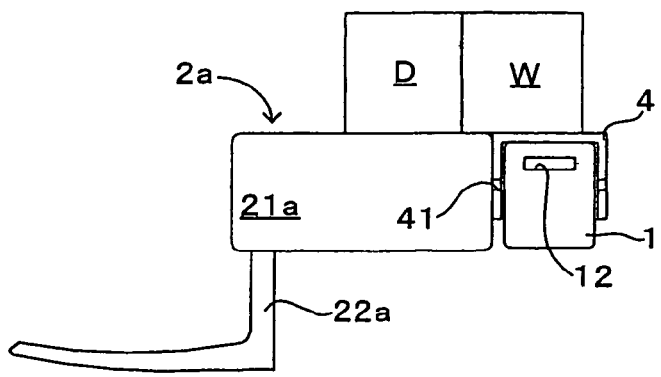
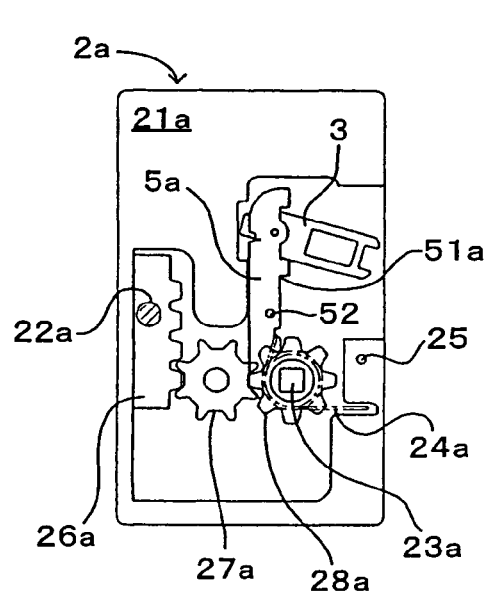
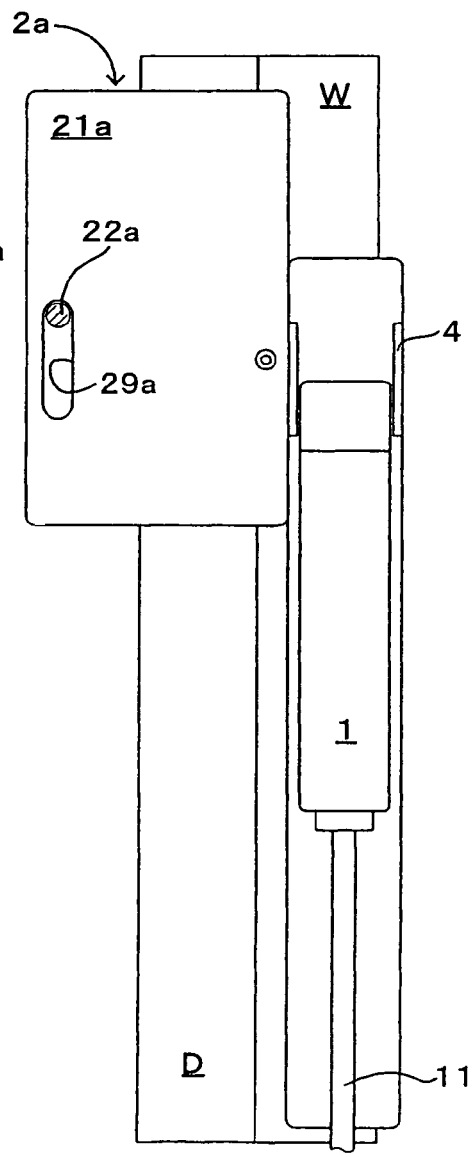
FIG. 3A
FIG. 3B
FIG. 3C

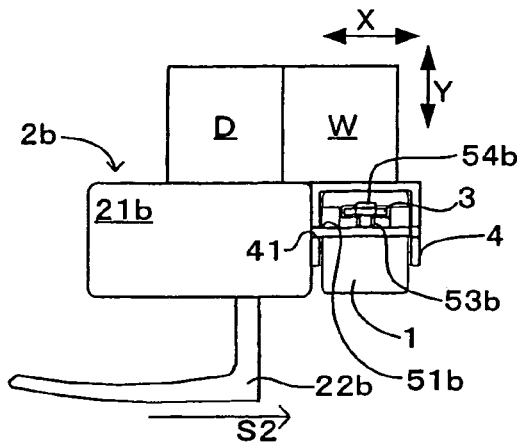
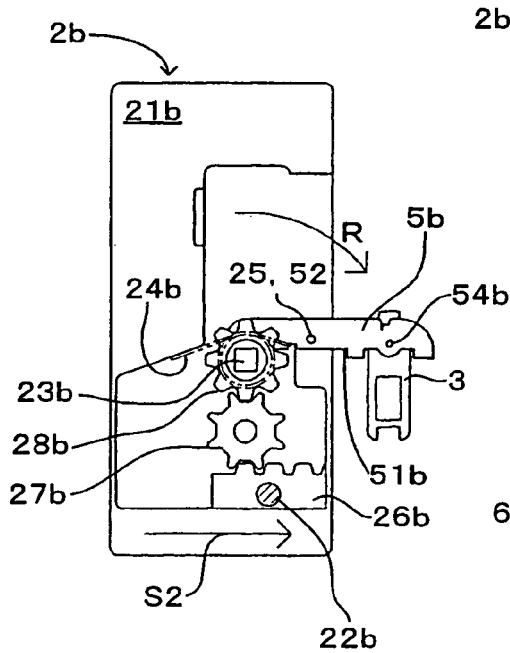
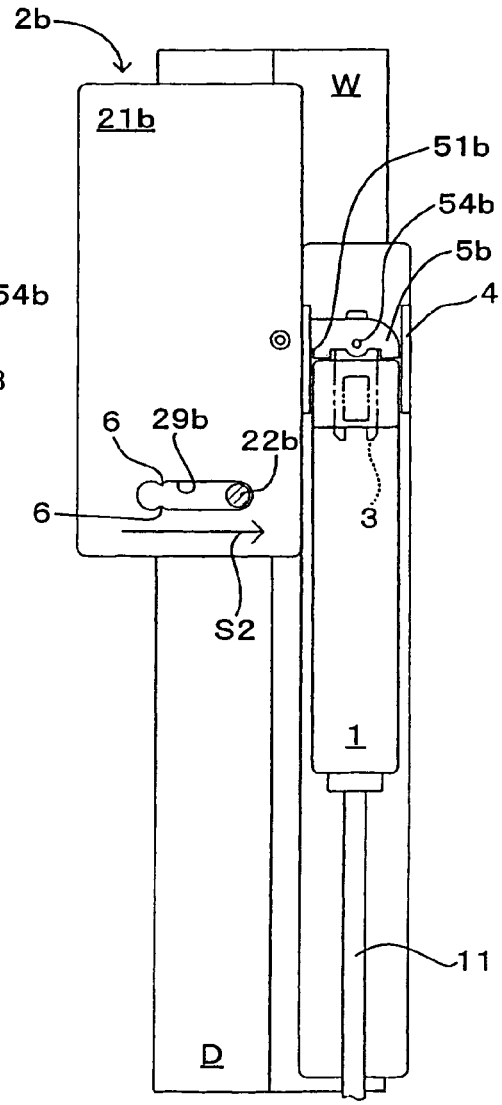

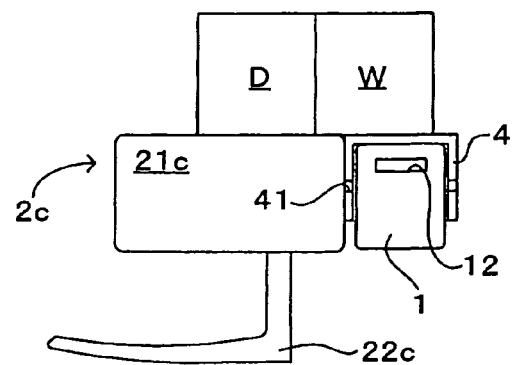
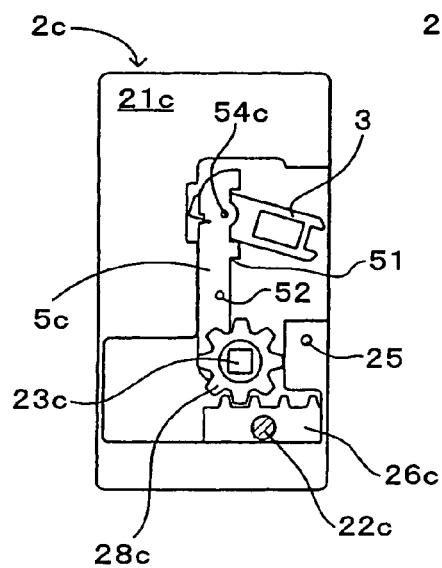
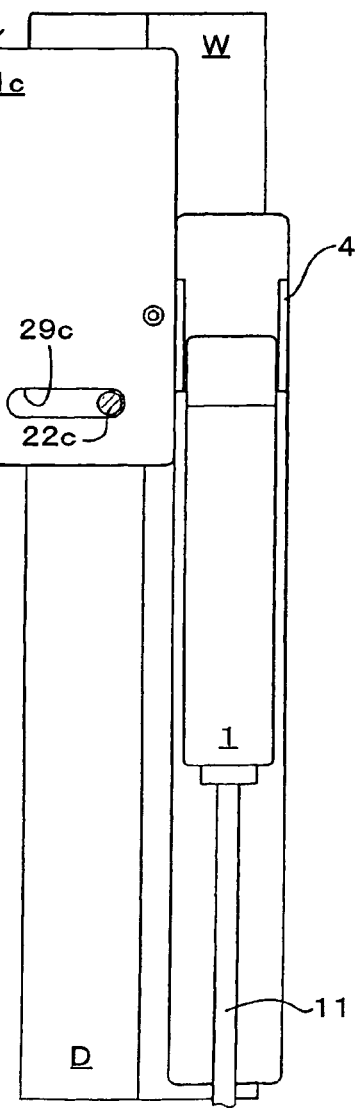
FIG. 7A
FIG. 7B
FIG. 7C

DOOR LOCK DEVICE WITH SAFETY SWITCH

BACKGROUND OF THE INVENTION

1. Technical Field

The present invention relates to a door lock apparatus equipped with safety switch which operates, for example, to lock a protective door to industrial machines or such in a closed state.

2. Background Art

Conventionally, a safety switch is provided at a protective door or the like openably closing a doorway (opening) to a working area which is defined by partitioning walls and in which industrial machines such as machine tools or machining robots are installed. In order to prevent an operator from being involved in an accident in the working area, the safety switch is designed to de-energize the industrial machines when the protective door is open. As one example of such a safety switch, there is known a safety switch provided with a door lock apparatus with safety switch, as set forth in Patent Document 1. The locking apparatus is arranged such that the protective door is locked in the closed state unless a pivotal handle disposed at the protective door is manipulated to perform an operation of extracting an actuator from the safety switch, whereby the protective door is prevented from being opened.

This kind of door lock apparatus with safety switch operates as follows. In a case where the protective door is closed so that the industrial machines are in operation, the actuator fixed to the door is kept inserted in the safety switch installed at the doorway in the partitioning wall whereby the safety switch and the actuator are maintained in engagement such as to lock the protective door in the closed state. Thus, the protective door is prevented from being opened. In a case where the operator enters the working area, the operator may turn the pivotal handle for operatively opening/closing the door from a vertical position to a horizontal position, whereby the actuator, as interlocked with the pivotal handle so manipulated, is accommodated in a lock mechanism portion so as to be extracted from the safety switch. As a result, a stop signal is generated to disable the industrial machines, while the protective door is released from the state locked by the actuator and placed in an openable state.

Patent Document 1: Japanese Unexamined Patent Publication No. 2004-353849 ([0018], FIG. 1)

SUMMARY OF THE INVENTION

By the way, the following problem may occur in a case where the conventional door lock apparatus with safety switch mentioned above is applied to a protective door of slide type. A direction in which the actuator is inserted in or extracted from a switch body is the same as a moving direction of the protective door opened or closed. Hence, vibrations from the industrial machines, impact associated with the closing of the protective door and such make it impossible to ensure that the protective door is reliably locked in the closed state by merely inserting the actuator into the safety switch. It is feared that the protective door may automatically open to cut off power supply to the industrial machines, which may exhibit unexpected behavior.

In a case where the conventional door lock apparatus with safety switch is applied to a protective door of pivot type, the protective door can be locked in the closed state by inserting the actuator into the safety switch. However, the following problem may be encountered. If the operator makes a mistake trying to open the protective door without manipulating the pivotal handle, for example, a force applied by the operator is received only by an actuator insertion hole of the safety switch and an actuator engaging portion thereof. So much load is exerted on the safety switch and the actuator that the deformation or failure of the safety switch or actuator may result.

In view of the foregoing, it is a first object of the invention to provide a door lock apparatus with safety switch which is capable of assuredly locking the door.

It is a second object of the invention to provide a door lock apparatus with safety switch which is capable of assuredly locking the door without exerting load on the safety switch or the actuator and which is adapted to increase the durability of the safety switch.

According to the invention for achieving the first object, in a first aspect of the invention a door lock apparatus with safety switch for locking a door in a closed state which is openably/closably disposed in an opening of a partitioning wall defining a predetermined working area for machining tool, robot or the like, the apparatus comprises: a manipulation portion disposed at the door in order to be manipulated for performing an operation of opening the door and an operation of closing the door; and an actuator lock mechanism including a portion inserted into or extracted from a safety switch for ON/OFF switching a switch in the safety switch disposed on the partitioning wall at a periphery of the opening and operative to control the operation of the machine tool, the robot or the like, and is characterized in that the actuator lock mechanism is moved by the closing operation by way of the manipulation portion in a different direction from a moving direction of the door and is hooked to the partitioning wall side, thereby locking the door in the closed state.

According to this arrangement, the closing operation by way of the manipulation portion permits the actuator lock mechanism to be hooked to the partitioning wall side, thereby locking the door in the closed state. If, in this state, the anyone tries to open the door, the opening of the door is inhibited because the moving direction of the door differs from the moving direction of the actuator lock mechanism, so that the hooking relation between the actuator lock mechanism and the partitioning wall side is maintained. Whether the door is of the slide type or the pivot type, therefore, the door may be assuredly locked in the closed state because the direction in which the actuator lock mechanism is moved to be hooked to the partitioning wall side differs from the moving direction of the door opened or closed.

In a second aspect of the invention, an arrangement may also be made wherein the actuator lock mechanism is pivotally moved in the different direction from the moving direction of the door when the manipulation portion is manipulated. According to this arrangement, the closing operation by way of the manipulation portion closes the door as well as causes the actuator lock mechanism to be pivotally moved in the different direction from the moving direction of the door and to be hooked to the partitioning wall side, thereby locking the door. Further, the opening operation by way of the manipulation portion unlocks the door by canceling the hooking relation between the actuator lock mechanism and the partitioning wall side, thereby permitting the door to be opened. Therefore, the opening or closing of the protective door and the locking of the protective door in the closed state may be assuredly accomplished by the simple operation.

According to the invention for achieving the second object, in a third aspect of the invention a door lock apparatus with safety switch further comprises a fixing member disposed on the partitioning wall at the periphery of the opening, and is characterized in that the actuator lock mechanism includes: a lock portion releasably engaging with the fixing member thereby locking the door in the closed state when the closing operation by way of the manipulation portion is performed; and an actuator inserted into or extracted from the safety switch.

According to this arrangement, the closing operation by way of the manipulation portion closes the door as well as causes the actuator to be inserted into the safety switch for bringing the lock portion thereof into engagement with the fixing member, thereby locking the door in the closed state. Therefore, if anyone trying to open the door applies a force to the door in the closed state, the force for opening the door is not directly applied to the safety switch or the actuator because the lock portion and the fixing member are in engagement so that the door is assuredly locked in the closed state. It is thus ensured that the door can be reliably locked without exerting load on the safety switch or the actuator and that the safety switch achieves the increased durability.

In a fourth aspect of the invention, an arrangement may also be made wherein during the closing operation by way of the manipulation portion, the actuator is inserted into the safety switch after the lock portion engages with the fixing member. According to this arrangement, the door may be prevented from being vibrated because the lock portion first engages with the fixing member so as to lock the door in the closed state when the operation of closing the door by way of the manipulation portion is performed. Since the door is thus prevented from being vibrated, the insertion of the actuator into the safety switch may be assuredly accomplished, so that damages on the safety switch and the actuator may be obviated.

In a fifth aspect of the invention, an arrangement may also be made wherein the lock portion includes a coupling member which is pivotally moved about a pivotal shaft disposed at one end thereof in conjunction with the manipulation of the manipulation portion and which carries one end of the actuator on the other end thereof, and wherein the coupling member is pivotally moved to engage with the fixing member, thereby locking the door in the closed state. According to this arrangement, the closing operation by way of the manipulation portion causes the coupling member to be pivotally moved about the pivotal shaft so as to engage with the fixing member as well as causes the actuator to be inserted into the safety switch. By performing the closing operation by way of the manipulation portion, both the locking of the door in the closed state and the insertion of the actuator into the safety switch may be accomplished at a time. Hence, the actuator lock mechanism may be implemented in a simple construction. If anyone trying to open the door applies a force to the door, the force for opening the door is not directly applied to the safety switch or the actuator because the lock portion and the fixing member are in engagement so that the door is locked in the closed state. In this case, the lock strength of the door, irrespective of the switch body or the actuator, may be easily varied by changing the materials of the coupling member and fixing member or changing the thicknesses thereof. This negates the need for increasing the size of the safety switch in order to increase the strengths of the safety switch and the actuator.

In a sixth aspect of the invention, an arrangement may also be made wherein the actuator lock mechanism includes: an actuator inserted into or extracted from the safety switch; and a coupling member which is pivotally moved about a pivotal shaft disposed at one end thereof in conjunction with the manipulation of the manipulation portion and which carries one end of the actuator on the other end thereof, and wherein the actuator is pivotally supported by the other end of the coupling member. According to this arrangement, the other end of the actuator inserted into the safety switch is less protruded as compared with a case where the actuator is not pivotally supported by the coupling member. Hence, the actuator may be smoothly inserted into the safety switch.

In a seventh aspect of the invention, an arrangement may also be made wherein the manipulation portion is a pivotal member coupled with the pivotal shaft of the coupling member and the coupling member is pivotally moved in conjunction with the pivotal motion of the pivotal member. According to this arrangement, the coupling member (actuator lock mechanism) is adapted to pivot as interlocked with the pivotal member turned by the operator. Hence, the coupling member may be pivotally moved by means of a simple construction.

In an eighth aspect of the invention, an arrangement may also be made which further comprises: a casing which is disposed on the door and in which the actuator lock mechanism is accommodated by the opening operation by way of the manipulation portion; and a biasing member disposed in the casing for biasing the actuator lock mechanism in a move-in direction into the casing. According to this arrangement, when the opening operation by way of the manipulation portion is performed to unlock the door and to open the opening, the actuator lock mechanism is accommodated in the casing by the biasing force of the biasing member. When materials or the like are carried into the working area, therefore, the actuator lock mechanism may be prevented from being damaged by some material stuck on the actuator lock mechanism.

According to the first aspect of the invention, if anyone tries to open the door in the state where the door is locked in the closed state by performing the closing operation by way of the manipulation portion to thereby hook the actuator lock mechanism to the partitioning wall side, the moving direction of the door differs from the moving direction of the actuator lock mechanism so that the hooking relation between the actuator lock mechanism and the partitioning wall side is maintained to inhibit the opening of the door. Whether the door is of the slide type or of the pivot type, therefore, the door may be assuredly locked in the closed state.

According to the second aspect of the invention, the closing operation by way of the manipulation portion closes the door as well as causes the actuator lock mechanism to be pivotally moved in the different direction from the moving direction of the door and to be hooked to the partitioning wall side thereby locking the door. On the other hand, the opening operation by way of the manipulation portion unlocks the door by canceling the hooking relation between the actuator lock mechanism and the partitioning wall side, thereby permitting the door to be opened. Therefore, the opening or closing of the door and the locking of the door in the closed state may be assuredly accomplished by the simple operations.

According to the third aspect of the invention, if anyone trying to open the door applies a force to the locked door, the force for opening the door is not directly applied to the safety switch or the actuator because the lock portion and the fixing member are in engagement so that the door is assuredly locked in the closed state. Therefore, the door may be assuredly locked without exerting load on the safety switch or the actuator, while the safety switch may achieve the increased durability.

According to the fourth aspect of the invention, when the operation of closing the door is performed by way of the manipulation portion, the lock portion first engages with the fixing member for locking the door so that the actuator may be assuredly inserted into the safety switch in the state where the door is prevented from being vibrated. Therefore, damages on the safety switch and the actuator may be obviated.

According to the fifth aspect of the invention the invention, both the locking of the door in the closed state and the insertion of the actuator into the safety switch may be accomplished at a time by performing the closing operation by way of the manipulation portion. Hence, the actuator lock mechanism may be implemented in the simple construction. Since the door is locked in the closed state by way of the engagement between the coupling member and the fixing member, the force for opening the door is not directly applied to the safety switch or the actuator. Hence, the lock strength of the door, irrespective of the switch body or the actuator, may be easily varied by changing the materials of the coupling member and fixing member or changing the thicknesses thereof. This negates the need for increasing the size of the safety switch in order to increase the strengths of the safety switch and the actuator.

According to the sixth aspect of the invention, the other end of the actuator inserted into the safety switch is less protruded as compared with a case where the actuator is not pivotally supported by the coupling member. Hence, the actuator may be smoothly inserted into the safety switch.

According to the seventh aspect of the invention, the coupling member (actuator lock mechanism) is adapted to pivot as interlocked with the pivotal member turned by the operator. Hence, the coupling member may be pivotally moved by means of the simple construction.

According to the eighth aspect of the invention, when the door is unlocked and the opening is opened by performing the opening operation by way of the manipulation portion, the actuator lock mechanism is accommodated in the casing by the biasing force of the biasing member. When materials or the like are carried into the working area, therefore, the actuator lock mechanism may be prevented from being damaged by some material stuck on the actuator lock mechanism.

BRIEF DESCRIPTION OF THE DRAWINGS

FIGS. 1A, 1B, 1C and 1D show a door lock apparatus with safety switch according to a first embodiment of the invention;

FIGS. 2A, 2B, 2C, 2D and 2E show the door lock apparatus with safety switch according to the first embodiment of the invention;

FIGS. 3A, 3B and 3C show a door lock apparatus with safety switch according to a second embodiment of the invention;

FIGS. 6A, 6B and 6C show the door lock apparatus with safety switch according to the third embodiment of the invention;

FIGS. 7A, 7B and 7C show a door lock apparatus with safety switch according to a fourth embodiment of the invention;

DETAILED DESCRIPTION OF THE INVENTION

First Embodiment

Figure 4A:
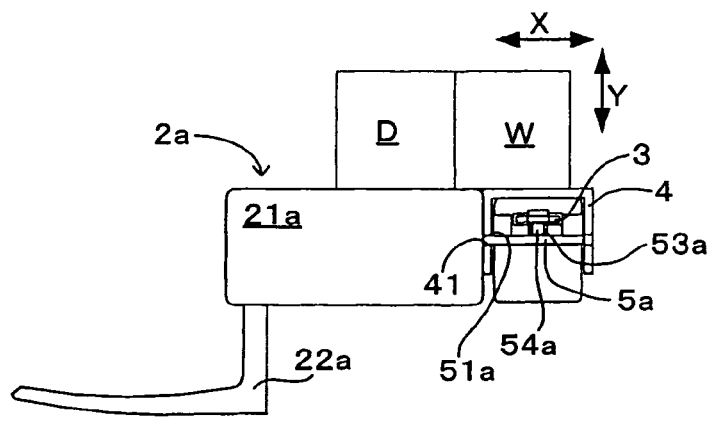
FIGS. 4A, 4B and 4C show the door lock apparatus with safety switch according to the second embodiment of the invention.

A first embodiment of the invention is described with reference to FIGS. 1A-1D and FIGS. 2A-2E. FIGS. 1A-1D and FIGS. 2A-2E illustrate a door lock apparatus with safety switch according to the invention. FIGS. 1A-1D show a state where a protective door is unlocked. FIGS. 2A-2E show a state where the protective door is locked. FIG. 1A, FIG. 2A and FIG. 2B are plan views of the door lock apparatus with safety switch as seen from above. FIG. 1B and FIG. 2C are partially-sectioned front views of a handle portion of the door lock apparatus with safety switch as seen from outside a working area. FIG. 1C and FIG. 2D are front views of the door lock apparatus with safety switch as seen from outside the working area. FIG. 1D and FIG. 2E are right side views of the door lock apparatus with safety switch. It is noted that FIG. 2A depicts only a lock mechanism portion of the door lock apparatus with safety switch, the lock mechanism portion disposed at an aluminum frame constituting a periphery of the protective door.

As shown in FIGS. 1A-1D, the door lock apparatus with safety switch according to the invention comprises: a switch body 1 (equivalent to "safety switch" of the invention) electrically connected to industrial machines such as a robot via a cable 11; and a lock mechanism portion 2. The lock mechanism portion 2 comprises: an actuator 3 inserted in or extracted from the switch body 1 through an actuator insertion hole 12 for changing the ON/OFF state of an unillustrated switch disposed in the switch body 1; a casing 21 in which the actuator 3 and a coupling member 5 are accommodated; and a pivotal handle 22. The switch body 1 is mounted to place by way of a fixing member 4 having a U-shape as seen in plan and fixed to a frame W formed from, for example, aluminum and constituting the periphery of an opening (doorway) of a partitioning wall defining the working area in which industrial machines such as machine tools or machining robots work. The switch body 1 is formed with the actuator insertion hole 12 in a top side thereof. The cable 11 connected with the switch (not shown) disposed in the switch body 1 is led out of the switch body 1 through a lead-out port formed in a bottom side thereof and is connected to the industrial machines such as the robot. Power supply to the industrial machines, for example, is ON/OFF switched by way of the switching action of the switch whereby the operation of the industrial machines is controlled. The fixing member 4 is formed with an engagement groove 41 engageable with an engaging portion 51 of the coupling member 5 to be described hereinlater.

The casing 21 constituting the lock mechanism portion 2 is fixed to a frame D formed from, for example, aluminum and constituting a periphery of the protective door free to open/close the opening of the partitioning wall. Disposed in the casing 21 is the coupling member 5 which is provided with a pivotal shaft 23 at one end thereof, the pivotal shaft coupled with the pivotal handle 22 (equivalent to "manipulation portion" and "pivotal member" of the invention), and which pivotally carries one end of the actuator 3 at the other end thereof. The coupling member is adapted to pivot as interlocked with the pivotal motion of the pivotal handle 22. The coupling member 5 is centrally formed with the engaging portion 51 releasably engageable with the aforementioned engagement groove 41 of the fixing member 4. An arrangement is made such that the engaging portion 51 is brought into engagement with the engagement groove 41 by the coupling member 5 pivotally moved as interlocked with the pivotal handle 22 pivotally moved in a direction of a solid arrow LK in FIG. 2D and that, as shown in FIG. 1C, the engaging portion is disengaged from the engagement groove 41 by the coupling member 5 pivotally moved in conjunction with the pivotal motion of the pivotal handle 22 in a direction of a solid arrow ULK in FIG. 2D. By turning the pivotal handle 22 in this manner to perform an operation of closing the protective door, the coupling member 5 interlocked with the pivotal handle is pivotally moved in the same direction as the pivotal handle 22, thereby bringing the engaging portion 51 thereof into engagement with the engagement groove 41 as shown in FIG. 2B. Thus, the fixing member 4 and the coupling member 5 are hooked to each other. This inhibits the coupling member 5 from moving in two directions which include a direction of an arrow X and a direction of an arrow Y shown in FIG. 2B, the direction of the arrow Y equivalent to open/close direction of the protective door. Hence, the protective door is locked in a closed state. That is, the coupling member 5 functions as "lock portion" of the invention. The coupling member 5 shaped like a plate is formed with recesses 52 on both sides thereof. The recesses 52 are free to engage with or disengage from projections 25 to be described hereinlater.

The actuator 3 has one end thereof supported by the coupling member 5 via a helical coil spring 53 in a manner to be pivotally movable about a support pin 54. As shown in FIG. 1B, the other end of the actuator is biased by the helical coil spring 53 toward the pivotal shaft 23 of the coupling member 5. By turning the pivotal handle 22 to perform the operation of closing the protective door, the actuator 3 interlocked with the coupling member 5 is pivotally moved in the same direction as the pivotal handle 22 so that the other end of the actuator is inserted through the actuator insertion hole 12 into the switch body 1, as shown in FIG. 2D. In this process, the actuator 3 is inserted in the switch body 1 as pivotally moved about the support pin 54 against the biasing force of the helical coil spring 53. Thus, the coupling member 5 and the actuator 3 function as "actuator lock mechanism" of the invention.

As shown in FIG. 1B, a helical coil spring 24 (equivalent to "biasing member" of the invention) for biasing the coupling member 5 and the actuator 3 in a move-in direction into the casing 21 is disposed in the casing 21. Hence, an operation of opening the protective door may be performed by turning the pivotal handle 22 in the direction of the solid arrow ULK in FIG. 2D, whereby the coupling member 5 and the actuator 3 as interlocked with the pivotal handle 22 are pivotally moved in the same direction as the pivotal handle 22 so as to be assuredly accommodated in the casing 21. The casing 21 is formed with the projections 25 which are free to engage with or disengage from the aforementioned recesses 52 formed on the both sides of the coupling member 5 and which are adapted to clamp the coupling member 5 therebetween. As shown in FIG. 2C, the projections 25 are designed to engage with the recesses 52 as clamping the coupling member 5 therebetween, thereby retaining the actuator 3 in the state inserted in the switch body 1 as resisting the helical coil spring 24 biasing the coupling member 5. The projections 25 are adapted to retractably project from an inside wall surface of the casing 21. That is, the projections are projected from the inside wall surface of the casing 21 by way of a biasing force of a spring or the like (leaf spring, compression spring, extension spring, rubber, air pressure, hydraulic pressure, magnet or the like). Therefore, when the pivotal handle 22 is turned in the direction of the solid arrow LK in FIG. 2D, the projections 25 first make sliding contact with the coupling member 5 pivotally moved as interlocked with the pivotal handle 22, as being retracted into the inside wall surface of the casing 21. When the pivotal handle 22 is turned to a predetermined position so as to establish the engagement between the engaging portion 51 of the coupling member 5 and the engagement groove 41, the recesses 52 are aligned with the projections 25. Then, the projections 25 are projected from the inside wall surface of the casing 21 by the biasing force of the spring or the like and engage with the recesses 52, thereby retaining the actuator 3 in the state inserted in the switch body 1 as resisting the helical coil spring 24 biasing the coupling member 5. In this manner, the projections 25 and the recesses 52 function as a retaining portion.

Next, description is made on operations. First, as shown in FIGS. 1A-1D, the lock mechanism portion 2 and the switch body 1 are brought into an adjoining relation by holding the pivotal handle 22 and moving the protective door for closing the opening into the working area. Subsequently when the pivotal handle 22 is turned in the direction of the solid arrow LK in FIG. 2D, the coupling member 5 is pivotally moved in the same direction in conjunction with the pivotal motion of the pivotal handle 22. Hence, the engaging portion 51 first engages with the engagement groove 41, whereby the coupling member 5 is inhibited from moving in both the directions X, Y so that the protective door is locked. By further turning the pivotal handle 22, the actuator 3 is inserted into the switch body 1 so as to change the ON/OFF state of the switch in the switch body 1. The industrial machines are energized, while the actuator 3 is maintained in the state inserted in the switch body 1 by way of the engagement between the projections 25 and the recesses 52.

When the pivotal handle 22 is turned in the direction of the solid arrow ULK in FIG. 2D, the coupling member 5 interlocked with the pivotal handle 22 is pivotally moved to extract the actuator 3 from the switch body 1 and to cancel the engagement between the engaging portion 51 thereof and the engagement groove 41. Thus, the coupling member 5 is allowed to move in both the directions X, Y. Therefore, the ON/OFF state of the switch in the switch body 1 is changed so that the industrial machines are de-energized while the protective door is unlocked so as to be allowed to open.

According to the embodiment as described above, the protective door is closed by performing the closing operation by way the pivotal handle 22. In addition, the closing operation causes the actuator 3 to be inserted into the switch body 1 for bringing the engaging portion 51 of the coupling member 5 into engagement with the engagement groove 41 thereby locking the protective door in the closed state. Therefore, if an operation mistake is made to forcibly open the protective door in the locked state, the force for opening the protective door is not directly applied to the switch body 1 or the actuator 3 because the engaging portion 51 engages with the engagement groove 41 of the fixing member 4 so that the protective door is locked in the closed state. Further, if the protective door and the like are vibrated due to the vibrations of the industrial machines working in the working area, the switch body 1 and the actuator 3 may be prevented from being directly affected by such vibrations. Therefore, the door can be assuredly locked without exerting load on the safety switch or the actuator and besides, the safety switch may achieve an increased durability.

According to the embodiment, the actuator 3 supported by the other end of the coupling member 5 is inserted in an operation portion of the switch body 1. The engaging portion 51 of the coupling member 5 engages with the engagement groove 41, whereby the coupling member 5 may be inhibited from moving in the both directions X, Y. By performing the closing operation by way of the pivotal handle 22, the coupling member 5 is pivotally moved about the pivotal shaft 23 to bring the engaging portion 51 thereof into engagement with the engagement groove 41 of the fixing member 4, while the actuator 3 is inserted into the switch body 1 so that the engaging portion 51 of the coupling member 5 engages with the fixing member 4. Therefore, the protective door is prevented from moving in the two directions including the open/close direction of the protective door. Hence, the protective door may be more assuredly locked in the closed state without rattling. Whether the protective door is of a slide type which is opened in the X direction or of a pivot type which is opened in the Y direction, the protective door may be assuredly locked in the closed state because the protective door is inhibited from moving in the two directions including the open/close direction of the door.

The locking of the protective door in the closed state and the insertion of the actuator 3 into the switch body 1 may be accomplished at a time by performing the closing operation by way of the pivotal handle 22. If a force for opening the door is applied to the protective door, the engaging portion 51 of the coupling member engages with the fixing member 4 fixed to the frame W constituting the periphery of the opening of the partitioning wall, thereby inhibiting the movement of the protective door and locking the protective door in the closed state. Hence, the force for opening the door is not directly applied to the switch body 1 or the actuator 3. It is noted here that the lock strength of the protective door, irrespective of the switch body 1 or the actuator 3, may be easily varied according to an intended purpose by changing the materials of the coupling member 5 and fixing member 4 (metal, plastic or the like) or changing the thicknesses thereof. This negates the need for increasing the size of the safety switch in order to increase the strengths of the switch body 1 and the actuator 3.

According to the embodiment, when the protective door is unlocked and the opening is opened by performing the opening operation by way of the pivotal handle 22, the actuator 3 is accommodated in the casing 21 by means of the biasing force of the helical coil spring 34. When materials or the like are carried into the working area, therefore, the actuator 3 may be prevented from being damaged by some material stuck on the actuator 3.

According to the embodiment, when the protective door is locked in the closed state by performing the closing operation by way of the pivotal handle 22, the projections 25 and the recesses 52 are in engagement whereby the actuator 3 can be maintained in the state inserted in the switch body 1. Hence, the actuator 3 may be prevented from being readily extracted from the switch body 1 by the biasing force of the helical coil spring 24.

According to the embodiment, when the closing operation by way of the pivotal handle 22 is yet to be performed and the actuator 3 is out of the switch body 1, the other end of the actuator 3 is biased by the helical coil spring 53 toward the pivotal shaft 23 of the coupling member 5. When the other end of the actuator 3 is inserted into the switch body 1 by performing the closing operation by way of the pivotal handle 22, the actuator 3 is inserted into the switch body 1 while the other end thereof is pivotally moved away from the pivotal shaft 23 of the coupling member 5 against the biasing force of the helical coil spring 53. In this manner, the actuator 3 is pivotally carried on the coupling member 5 so that the actuator 3 is inserted into the switch body 1 as pivotally moved relative to the coupling member 5. Hence, the other end of the actuator 3 inserted into the switch body 1 is less protruded as compared with a case where the actuator 3 is not pivotally supported by the coupling member. Therefore, a space to be provided to allow for the pivotal motion of the coupling member 5 including the actuator 3 may be reduced. This also negates the need for increasing the size of the actuator insertion hole 12 of the switch body 1 in order to impart some room to the insertion hole. As a result, the apparatus may be downsized. What is more, the insertion of the actuator 3 into the switch body 1 may be facilitated.

According to the embodiment, when the operation of closing the protective door is performed by way of the pivotal handle 22, the engaging portion 51 first engages with the engagement groove 41 so that the protective door is locked in the closed state. Hence, the protective door is prevented from being vibrated. Since the actuator 3 is inserted into the switch body 1 with the vibrations of the protective door thus prevented, the actuator 3 being inserted into the operation portion may be prevented from making contact with a body case of the switch body 1. It is therefore ensured that the actuator 3 is reliably inserted into the operation portion of the switch body 1. Accordingly, damages caused by the contact between the actuator 3 and the switch body 1 or the like may be assuredly obviated.

According to the embodiment, the coupling member 5 is pivotally moved as interlocked with the pivotal handle 22 turned by the operator. Hence, the coupling member 5 may be pivotally moved using a simple construction.

Second Embodiment

Figure 4B:
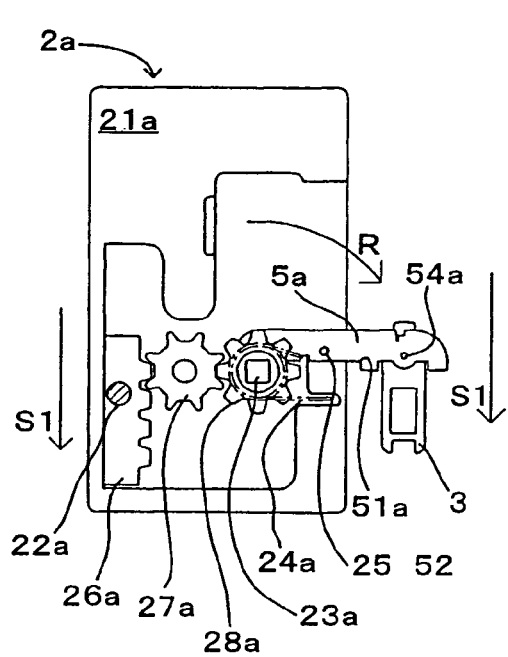
Figure 4C:
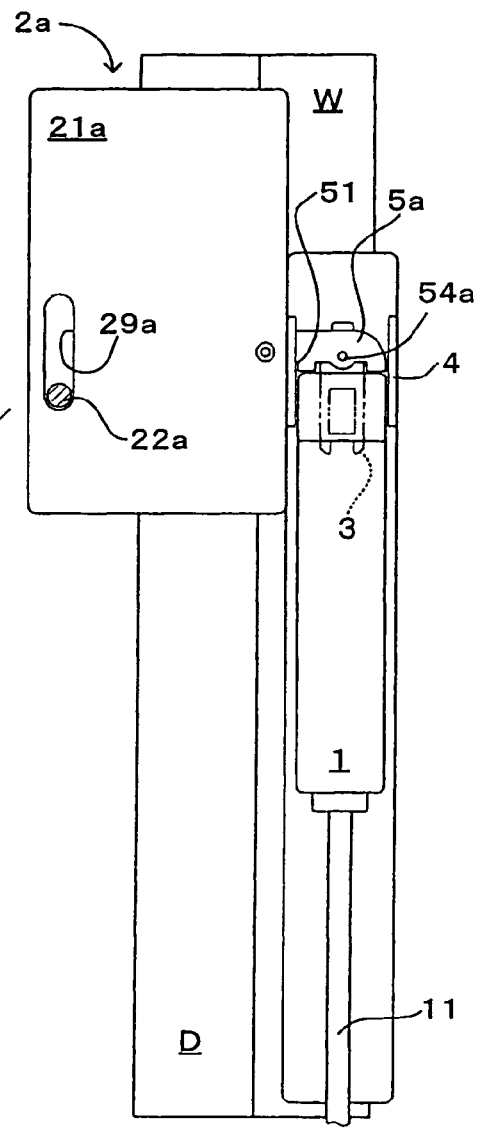

A second embodiment of the invention is described with reference to FIGS. 3A-3C and FIGS. 4A-4B. FIGS. 3A-3C and FIGS. 4A-4C illustrate a door lock apparatus with safety switch according to the invention. FIGS. 3A-3C show a state where the protective door is unlocked. FIGS. 4A-4C show a state where the protective door is locked. FIG. 3A and FIG. 4A are plan views of the door lock apparatus with safety switch as seen from above. FIG. 3B and FIG. 4B are partially-sectioned front views of a handle portion of the door lock apparatus with safety switch as seen from front outside the working area. FIG. 3C and FIG. 4C are front views of the door lock apparatus with safety switch as seen from outside the working area.

A major difference of the second embodiment from the above first embodiment is that a lock mechanism portion 2a comprises: a slide handle 22a, a slide gear 26a and rotary gears 27a, 28a. The constitutions and operations of the other parts are the same as those of the first embodiment. Focusing on the difference from the first embodiment, a detailed description is made on the second embodiment as below. Like reference characters refer to the corresponding parts of the first embodiment and the description on the constitutions and operations thereof is dispensed with.

As shown in FIGS. 3A-3C, a casing 21a is formed with a slide groove 29a and the slide handle 22a is disposed in a manner to be free to slide along the slide groove 29a in a direction of an arrow S1 in FIG. 4B. As shown in FIGS. 3A-3C, disposed in the casing 21a are: the slide gear 26a coupled with the slide handle 22a; the rotary gear 28a coupled with a pivotal shaft 23a of a coupling member 5a; and the rotary gear 27a for transmitting the linear motion of the slide gear 26a to the rotary gear 28a as converting the linear motion into a rotary motion. Therefore, when the slide handle 22a is slidably moved in the direction of the arrow S1 from a position shown in FIG. 3B to a position shown in FIG. 4B, the slide gear 26a as interlocked with the slide handle 22a is moved in the direction of the arrow S1. Following the movement of the slide gear 26a in the direction of the arrow S1, the rotary gear 27a is rotated counterclockwise as seen in an axial direction shown in FIG. 4B. Following the rotary gear 27a, the rotary gear 28a is rotated in the opposite direction, so that the coupling member 5a is pivoted in a direction of an arrow R in FIG. 4B.

Next, description is made on operations. First, as shown in FIGS. 3A-3C, the lock mechanism portion 2a and the switch body 1 are brought into the adjoining relation by holding the slide handle 22a and performing the closing operation for closing the opening into the working area with the protective door. Subsequently, a sliding operation is performed for sliding the slide handle 22a to the position shown in FIG. 4B in the direction of the arrow S1, whereby the coupling member 5a is pivotally moved in the direction of the arrow R in conjunction with the sliding movement of the slide handle 22a. Then, an engaging portion 51a engages with the engagement groove 41 so that the coupling member 5a is inhibited from moving in both directions of arrows X, Y in FIG. 4A and the protective door is locked. By further sliding the slide handle 22a, the actuator 3 is inserted into the switch body 1 thereby changing the ON/OFF state of the switch in the switch body 1. Hence, the industrial machines are energized, while the actuator 3 is maintained in the state inserted in the switch body 1 by way of the engagement between the projections 25 and the recesses 52 (see FIGS. 4A-4C).

When the slide handle 22a is slidably moved in the opposite direction to the direction of the arrow S1, as shown in FIGS. 3A-3C, the actuator 3 is extracted from the switch body 1 while the engagement between the engaging portion 51a and the engagement groove 41 is cancelled. Hence, the ON/OFF state of the switch in the switch body 1 is changed so that the industrial machines are de-energized while the protective door is unlocked. According to the embodiment as described above, a single slide handle 22a may be manipulated to openably close the opening with the protective door and to lock the protective door in the closed state. It is therefore easy to carry out the operation of closing the protective door. In a case where the slide door is adopted as the protective door, when the protective door is opened or closed by holding the slide handle 22a, the slide handle 22a is abutted against and pressed against an inside surface of the slide groove 29a thereby permitting the protective door to be opened or closed in a sliding direction (direction of the arrow X).

Third Embodiment

Figure 5A:
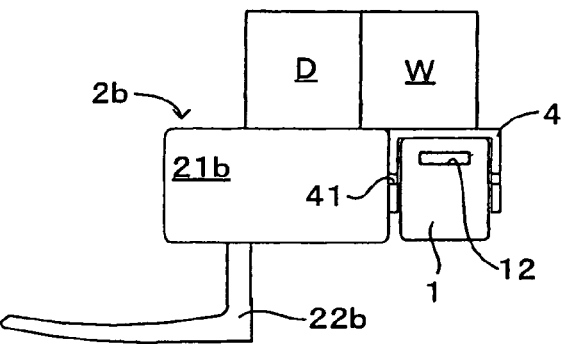
FIGS. 5A, 5B and 5C show a door lock apparatus with safety switch according to a third embodiment of the invention.
Figure 5B:
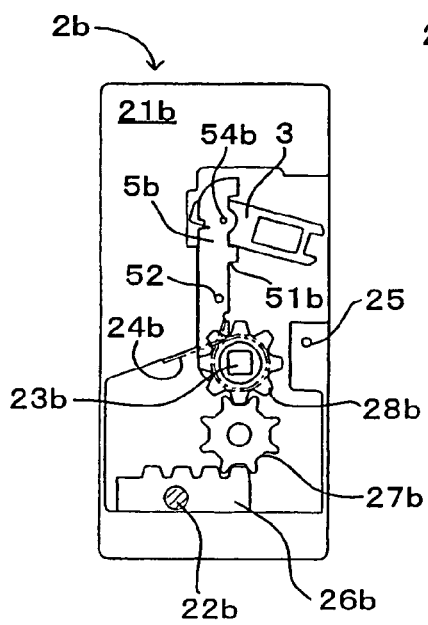
Figure 5C:
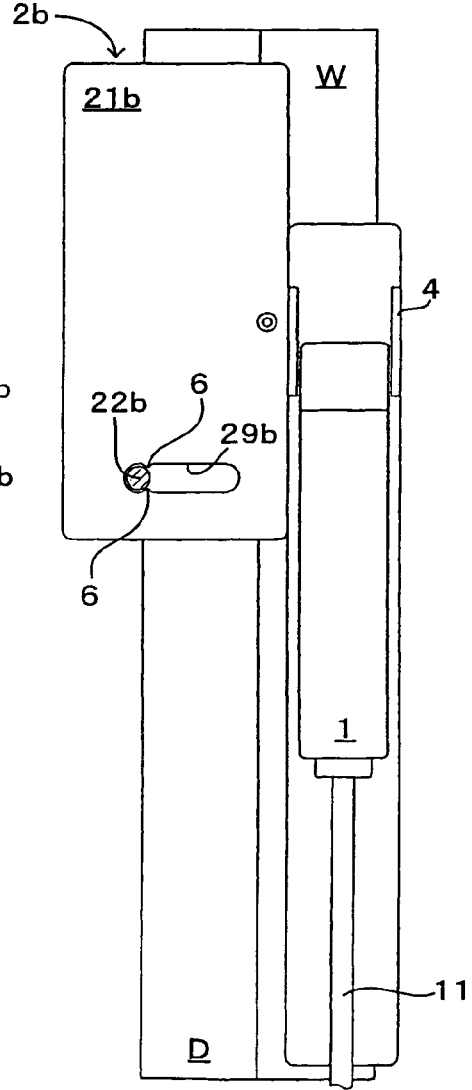

A third embodiment of the invention is described with reference to FIGS. 5A-5C and FIGS. 6A-6C. FIGS. 5A-5C and FIGS. 6A-6C illustrate a door lock apparatus with safety switch according to the invention. FIGS. 5A-5C show a state where the protective door is unlocked. FIGS. 6A-6C show a state where the protective door is locked. FIG. 5A and FIG. 6A are plan views of the door lock apparatus with safety switch as seen from above. FIG. 5B and FIG. 6B are partially-sectioned front views of a handle portion of the door lock apparatus with safety switch as seen from front outside the working area. FIG. 5C and FIG. 6C are front views of the door lock apparatus with safety switch as seen from outside the working area.

A major difference of the third embodiment from the above second embodiment is that a sliding direction of a slide handle 22b is the horizontal direction of an arrow S2. The constitutions and operations of the other parts are the same as those of the first and second embodiments. Focusing on the difference from the second embodiment, a detailed description is made on the third embodiment as below. Like reference characters refer to the corresponding parts of the first and second embodiments and the description on the constitutions and operations thereof is dispensed with.

As shown in FIGS. 5A-5C, a casing 21b is formed with a slide groove 29b and the slide handle 22b is disposed in a manner to be free to slide along the slide groove 29b in the direction of the arrow S2 in FIGS. 6A-6C. As shown in FIGS. 5A-5C, disposed in the casing 21b are: a slide gear 26b coupled with the slide handle 22b; a rotary gear 28b coupled with a pivotal shaft 23b of a coupling member 5b; and a rotary gear 27b for transmitting the linear motion of the slide gear 26b to the rotary gear 28b as converting the linear motion into a rotary motion. Accordingly, when the slide handle 22b is slidably moved in the direction of the arrow S2, the slide gear 26b as interlocked with the slide handle 22b is moved in the direction of the arrow S2. Following the movement of the slide gear 26b in the direction of the arrow S2, the rotary gear 27b is rotated counterclockwise as seen in an axial direction shown in FIG. 6B. Following the rotary gear 27b, the rotary gear 28b is rotated in the opposite direction, so that the coupling member 5b is pivoted in the direction of the arrow R in FIG. 6B.

According to the embodiment, the slide groove 29b is provided with projected portions 6. The projected portions 6 are adapted to retractably project from the casing 21b. The projected portions are adapted to be projected into the slide groove 29b by a predetermined biasing force of a spring or the like, and to be depressed into the casing 21b by applying a force exceeding the biasing force on the projected portions 6.

Next, description is made on operations. First, as shown in FIGS. 5A-5C, a lock mechanism portion 2b and the switch body 1 are brought into the adjoining relation by holding the slide handle 22b and performing the closing operation for closing the opening into the working area with the protective door. Subsequently, a sliding operation is performed wherein the force exceeding the biasing force on the projected portions 6 is applied to the slide handle 22a so as to depress the projected portions 6 into the casing 21b, before the slide handle 22b is slidably moved in the direction of the arrow S2. In conjunction with the sliding movement of the slide handle 22b, the coupling member 5b is pivotally moved in the direction of the arrow R. Then, an engaging portion 51b engages with the engagement groove 41 so that the coupling member 5b is inhibited from moving in both the directions of arrows X, Y in FIG. 6A, thereby locking the protective door. By further sliding the slide handle 22b, the actuator 3 is inserted into the switch body 1 thereby changing the ON/OFF state of the switch in the switch body 1. Hence, the industrial machines are energized, while the actuator 3 is maintained in the state inserted in the switch body 1 by way of the engagement between the projections 25 and the recesses 52 (see FIGS. 6A-6C).

When the slide handle 22b is slidably moved in the opposite direction to the direction of the arrow S2, as shown in FIGS. 5A-5C, the actuator 3 is extracted from the switch body 1 while the engagement between the engaging portion 51b and the engagement groove 41 is cancelled. Hence, the ON/OFF state of the switch in the switch body 1 is changed so that the industrial machines are de-energized while the protective door is unlocked.

As described above, the embodiment permits both the protective door of slide type and the protective door of pivot type to be adopted because the projected portions 6 are provided such that the slide handle 22b engaged with the projected portions 6 may be able to move the protective door in the sliding direction (the direction of the arrow X).

Fourth Embodiment

Figure 8A:
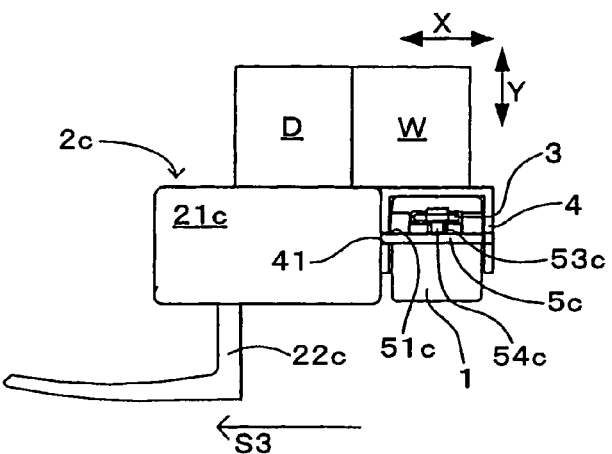
FIGS. 8A, 8B and 8C show the door lock apparatus with safety switch according to the fourth embodiment of the invention.
Figure 8B:
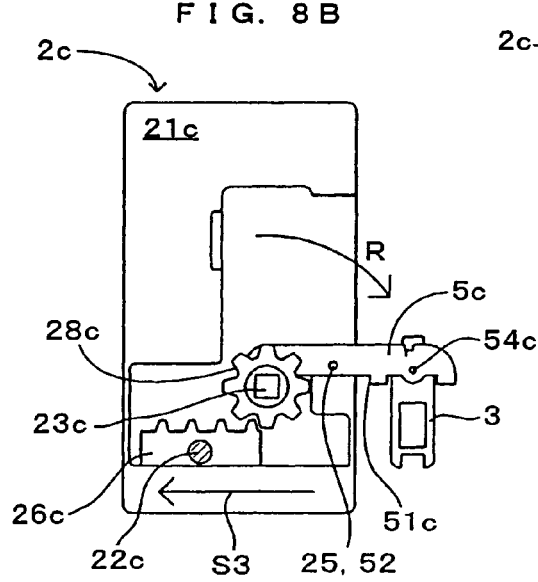
Figure 8C:
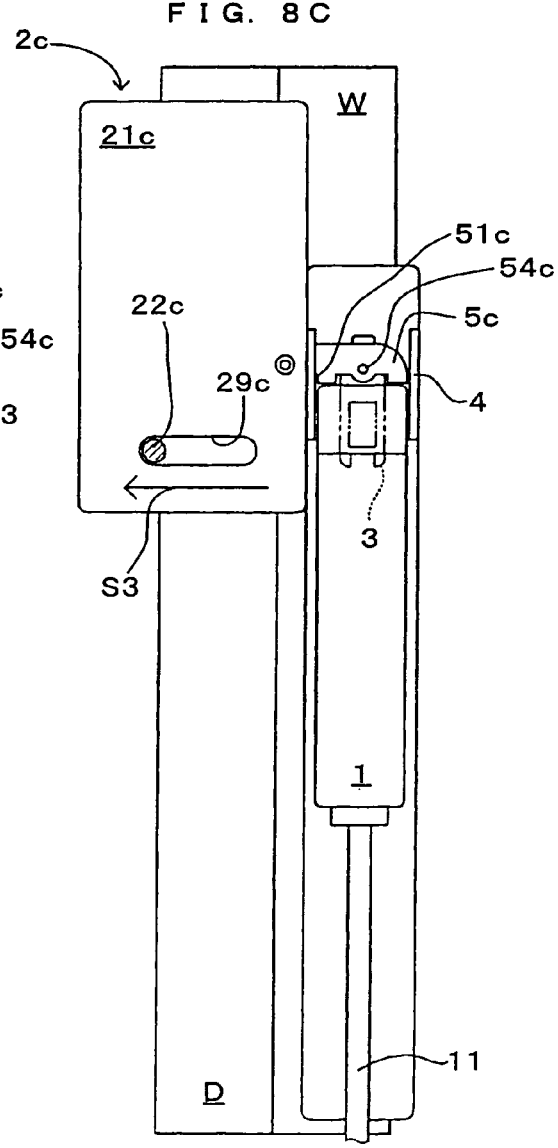

A fourth embodiment of the invention is described with reference to FIGS. 7A-7C and FIGS. 8A-8C. FIGS. 7A-7C and FIGS. 8A-8C illustrate a door lock apparatus with safety switch according to the invention. FIGS. 7A-7C show a state where the protective door is unlocked. FIGS. 8A-8C show a state where the protective door is locked. FIG. 7A and FIG. 8A are plan views of the door lock apparatus with safety switch as seen from above. FIG. 7B and FIG. 8B are partially-sectioned front views of a handle portion of the door lock apparatus with safety switch as seen from front outside the working area. FIG. 7C and FIG. 8C are front views of the door lock apparatus with safety switch as seen from outside the working area.

A major difference of the fourth embodiment from the above third embodiment is that after the opening into the working area is closed with the protective door, a slide handle 22c is slidably moved in a direction of an arrow S3 for locking the protective door in the closed state. The constitutions and operations of the other parts are the same as those of the first to third embodiments. Focusing on the difference from the third embodiment, a detailed description is made on the fourth embodiment as below. Like reference characters refer to the corresponding parts of the first to third embodiments and the description on the constitutions and operations thereof is dispensed with.

As shown in FIGS. 7A-7C, a casing 21c is formed with a slide groove 29c and the slide handle 22c is disposed in a manner to be free to slide along the slide groove 29c in a direction of an arrow S3 in FIGS. 8A-8C. As shown in FIG. 7B, disposed in the casing 21c are: a slide gear 26c coupled with the slide handle 22c; and a rotary gear 28c coupled with a pivotal shaft 23c of a coupling member 5c and adapted to follow the slide gear 26c. Therefore, when the slide handle 22c is slidably moved in the direction of the arrow S3, the slide gear 26c as interlocked with the slide handle 22c is moved in the direction of the arrow S3. Following the movement of the slide gear 26c in the direction of the arrow S3, the rotary gear 28c is rotated clockwise as seen in an axial direction shown in FIG. 8B, so that the coupling member 5c is pivoted in the direction of the arrow R in FIG. 8B.

Next, description is made on operations. First, as shown in FIGS. 7A-7C, a lock mechanism portion 2c and the switch body 1 are brought into the adjoining relation by holding the slide handle 22c and performing the closing operation for closing the opening into the working area with the protective door. Subsequently, a sliding operation is performed for sliding the slide handle 22c in the direction of the arrow S3, whereby the coupling member 5c is pivotally moved in the direction of the arrow R in conjunction with the sliding movement of the slide handle 22c. Then, an engaging portion 51c engages with the engagement groove 41 so that the coupling member 5c is inhibited from moving in both the directions of the arrows X, Y in FIG. 8A, thereby locking the protective door. By further sliding the slide handle 22c, the actuator 3 is inserted into the switch body 1 thereby changing the ON/OFF state of the switch in the switch body 1. Hence, the industrial machines are energized, while the actuator 3 is maintained in the state inserted in the switch body 1 by way of the engagement between the projections 25 and the recesses 52 (see FIGS. 8A-8C).

When the slide handle 22c is slidably moved in the opposite direction to the direction of the arrow S3, as shown in FIGS. 7A-7C, the actuator 3 is extracted from the switch body 1 while the engagement between the engaging portion 51b and the engagement groove 41 is cancelled. Hence, the ON/OFF state of the switch in the switch body 1 is changed so that the industrial machines are de-energized while the protective door is unlocked.

According to the embodiment as described above, a single slide handle 22c may be manipulated to openably close the opening with the protective door and to lock the protective door in the closed state. It is therefore easy to carry out the operation of closing the protective door.

Fifth Embodiment

Figure 9A:
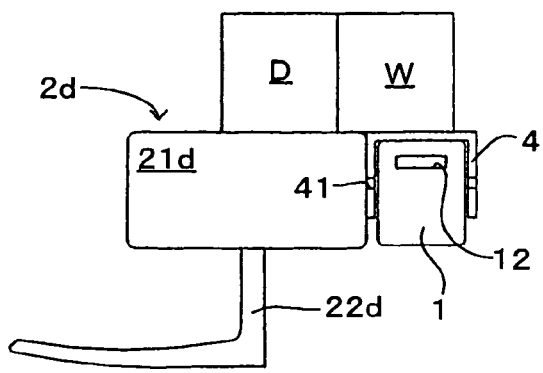
FIGS. 9A, 9B and 9C show a door lock apparatus with safety switch according to a fifth embodiment of the invention.
Figure 9B:
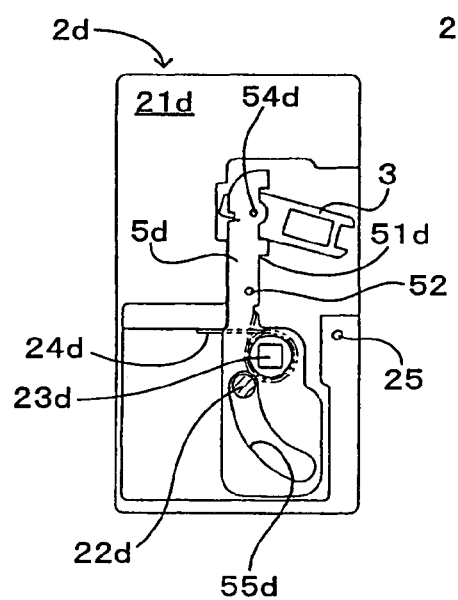
Figure 9C:
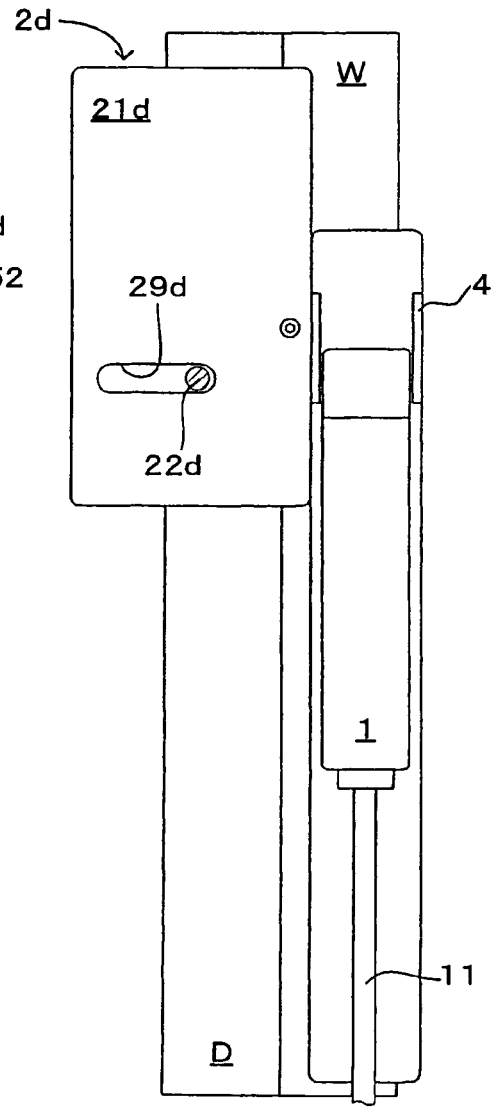
Figure 10A:
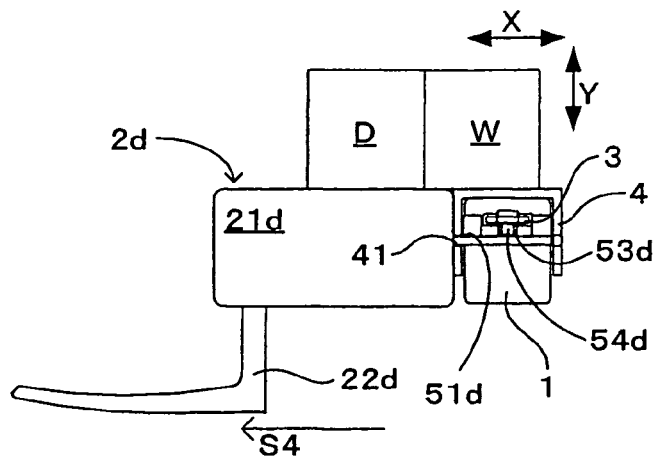
FIGS. 10A, 10B and 10C show the door lock apparatus with safety switch according to the fifth embodiment of the invention.
Figure 10B:
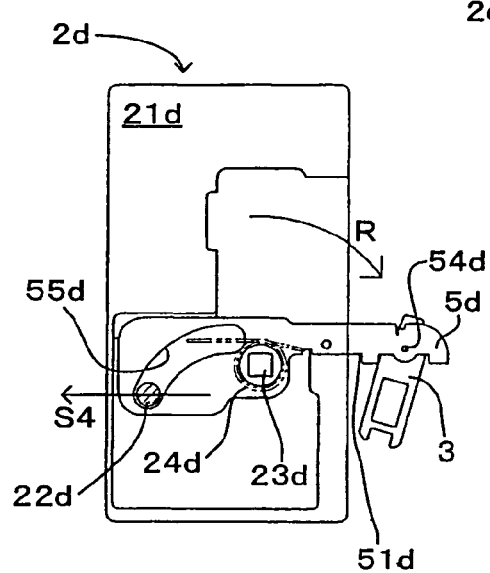
Figure 10C:
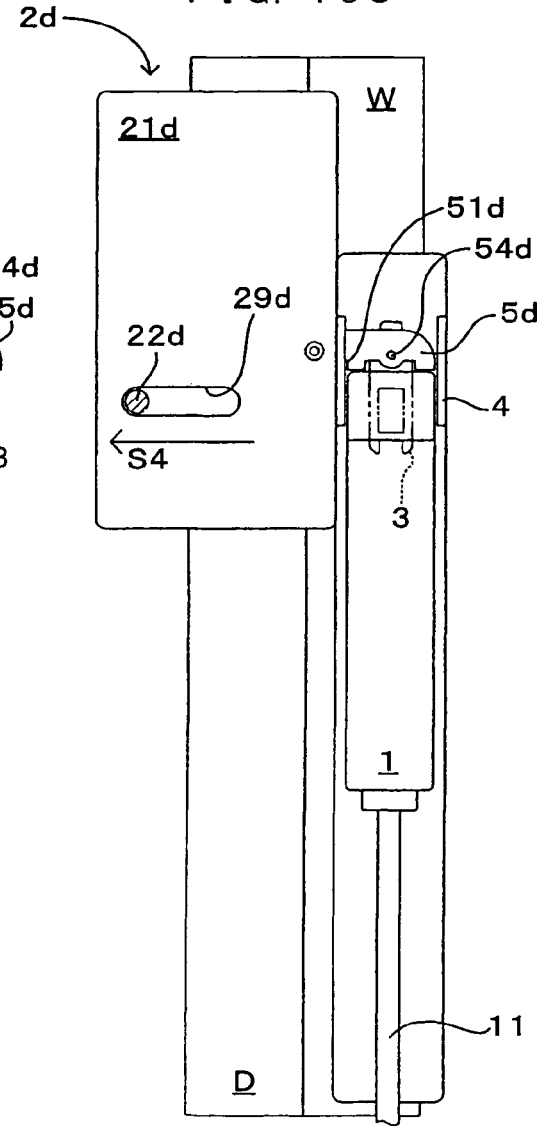

A fifth embodiment of the invention is described with reference to FIGS. 9A-9C and FIGS. 10A-10C. FIGS. 9A-9C and FIGS. 10A-10C illustrate a door lock apparatus with safety switch according to the invention. FIGS. 9A-9B show a state where the protective door is unlocked. FIGS. 10A-10C show a state where the protective door is locked. FIG. 9A and FIG. 10A are plan views of the door lock apparatus with safety switch as seen from above. FIG. 9B and FIG. 10B are partially-sectioned front views of a handle portion of the door lock apparatus with safety switch as seen from front outside the working area. FIG. 9C and FIG. 10C are front views of the door lock apparatus with safety switch as seen from outside the working area.

A major difference of the fifth embodiment from the above fourth embodiment is that a slide handle 22d is inserted through a cam groove 55d formed in a coupling member 5d such that the coupling member 5d may be pivotally moved about a pivotal shaft 23d in conjunction with the movement of the slide handle 22d. The constitutions and operations of the other parts are the same as those of the first to fourth embodiments. Focusing on the difference from the fourth embodiment, a detailed description is made on the fifth embodiment as below. Like reference characters refer to the corresponding parts of the first to fourth embodiments and the description on the constitutions and operations thereof is dispensed with.

As shown in FIGS. 9A-9C, a casing 21d is formed with a slide groove 29d and the slide handle 22d is disposed in a manner to be free to slide along the slide groove 29d in a direction of an arrow S4 in FIGS. 10A-10C. As shown in FIG. 9B, the coupling member 5d is disposed in the casing 21d in a manner to be free to pivot about the pivotal shaft 23d. The coupling member 5d is biased by a helical coil spring 24d in a move-in direction into the casing 21d. The coupling member 5d is formed with the arcuate cam groove 55d at one end thereof, in which the slide handle 22d is disposed in a manner to be free to move along the cam groove 55d. Therefore, when the slide handle 22d is slidably moved in the direction of the arrow S4 as shown in FIGS. 10A-10C, the slide handle 22d is slid on the cam groove 55d thereby causing the coupling member 5d interlocked therewith to be pivotally moved about the pivotal shaft 23d in the direction of the arrow R in FIG. 10B.

Next, description is made on operations. First, as shown in FIGS. 9A-9C, a lock mechanism portion 2d and the switch body 1 are brought into the adjoining relation by holding the slide handle 22d and performing the closing operation for closing the opening into the working area with the protective door. Subsequently, a sliding operation is performed for sliding the slide handle 22d in the direction of the arrow S4, whereby the coupling member 5d is pivotally moved in the direction of the arrow R in conjunction with the sliding movement of the slide handle 22d. Then, an engaging portion 51d engages with the engagement groove 41 so that the coupling member 5d is inhibited from moving in both the directions of the arrows X, Y in FIG. 10A, thereby locking the protective door. By further sliding the slide handle 22d, the actuator 3 is inserted into the switch body 1 thereby changing the ON/OFF state of the switch in the switch body 1. Hence, the industrial machines are energized, while the actuator 3 is maintained in the state inserted in the switch body 1 by way of the engagement between the projections 25 and the recesses 52 (see FIGS. 10A-10C).

When the slide handle 22d is slidably moved in the opposite direction to the direction of the arrow S4, as shown in FIGS. 9A-9C, the actuator 3 is extracted from the switch body 1 while the engagement between the engaging portion 51d and the engagement groove 41 is cancelled. Hence, the ON/OFF state of the switch in the switch body 1 is changed so that the industrial machines are de-energized while the protective door is unlocked.

According to the embodiment as described above, a single slide handle 22d may be manipulated to openably close the opening with the protective door and to lock the protective door in the closed state. It is therefore easy to carry out the operation of closing the protective door.

It is noted that the invention is not limited to the foregoing embodiments and various changes may be made thereto so long as such changes do not deviate from the scope of the invention. For instance, while the foregoing embodiments have the arrangement wherein the actuator lock mechanism comprises the actuator 3 and the coupling member 5 such that the coupling member 5 engages with the fixing member 4 for locking the protective door in the closed state, an arrangement may be made such that the actuator 3 is hooked to the switch body 1 for locking the protective door in the closed state. Namely, the actuator lock mechanism may comprise the actuator 3 alone. In such an arrangement, the actuator 3 is inserted into the switch body 1 in the state where the protective door closes the opening of the partitioning wall. If, in this state, anyone tries to open the protective door, the opening of the protective door is inhibited because the moving direction of the protective door differs from the direction in which the actuator 3 is extracted from the switch body 1, so that the actuator 3 cannot be extracted from the switch body 1 and is maintained in the locked state. Whether the protective door is of the slide type or the pivot type, the protective door may be assuredly locked in the closed state because the direction in which the actuator is inserted into or extracted from the switch body 1 differs from the moving direction of the protective door opened or closed. Since the direction in which the actuator lock mechanism is moved to be hooked to the partitioning wall side (switch body 1, fixing member 4) differs from the moving direction of the protective door opened or closed, the hooking relation between the actuator lock mechanism and the partitioning wall side is maintained to inhibit the opening of the door, if anyone tries to open the protective door. It is thus ensured that the door is locked in the closed state.

The embodiments have the arrangement wherein the manipulation portion used for performing the opening operation and closing operation of the protective door is provided at the protective door and wherein when the manipulation portion is manipulated, the actuator lock mechanism is pivotally moved in the different direction from the moving direction of the protective door and is inserted into or extracted from the operation portion. Therefore, the closing operation by way of the manipulation portion is adapted to close the protective door as well as to cause the actuator lock mechanism to be pivotally moved in the different direction from the moving direction of the protective door and to be hooked to the partitioning wall side (switch body 1, fixing member 4) for locking the door. Further, the opening operation by way of the manipulation portion is adapted to unlock the protective door by canceling the hooking relation between the actuator lock mechanism and the partitioning wall side, thereby allowing the protective door to be opened. Therefore, the opening or closing of the protective door and the locking of the protective door in the closed state may be assuredly accomplished by the simple operation.

According to the foregoing embodiments, the fixing member 4 is formed with the engagement groove 41, while the coupling member is formed with the engaging portion releasably engageable with the engagement groove 41. Alternatively, the engaging portion of the coupling member may be formed in a groove shape, while the fixing member may be configured to be releasably engageable with the groove-shaped engaging portion. Otherwise, the engaging portion may be formed in a groove shape which is releasably engageable with the engagement groove 41. Namely, the engaging portion may be formed in any shape so long as the engagement between the engaging portion and the fixing member is established in order to inhibit the coupling member including the engaging portion from being moved in the two directions including the moving direction of the protective door.

The foregoing embodiments have the arrangement wherein the coupling member is provided with the pivotal shaft at one end thereof and carries the actuator on the other end thereof and wherein the coupling member engages with the fixing member at the intermediate portion thereof. This arrangement permits the actuator 3 to be easily inserted into the switch body 1 after the lock portion (coupling member) is engaged with the fixing member 4. However, it goes without saying that an arrangement may be made wherein the coupling member is provided with the pivotal shaft at one end thereof and carries the actuator on the intermediate portion thereof and wherein the coupling member is engaged with the fixing member 4 at the other end thereof.

The manipulation portion is not limited to the pivotal handle and the slide handle but may employ any device such as a door knob that is capable of pivotally moving the actuator lock mechanism in conjunction with the manipulation made by the operator.

INDUSTRIAL APPLICABILITY

The invention is not limited to the foregoing embodiments and various changes or modifications may be made thereto so long as such changes or modifications do not deviate from the scope of the invention. The invention applies to a wide variety of uses for ensuring the safety of the operator by deactivating the machines when the protective door is not closed completely.

The invention claimed is:

1. A door lock apparatus with safety switch for locking a door in a closed state which is openably/closably disposed in an opening of a partitioning wall defining a predetermined working area for machining tool or robot, the apparatus comprising:
    a manipulation portion disposed at the door in order to be manipulated for performing an operation of opening the door and an operation of closing the door;
    an actuator lock mechanism including a portion inserted into or extracted from a safety switch for ON/OFF switching a switch in the safety switch disposed on the partitioning wall at a periphery of the opening and operative to control the operation of the machine tool or the robot;
    a fixing member disposed on the partitioning wall at the periphery of the opening,
        wherein the actuator lock mechanism further includes:

a lock portion releasably engaging with the fixing member thereby locking the door in the closed state when the closing operation by way of the manipulation portion is performed; and an actuator inserted into or extracted from the safety switch, and wherein the actuator lock mechanism is moved by the closing operation by way of the manipulation portion in a different direction from a moving direction of the door and is hooked to the partitioning wall side, thereby locking the door in the closed state, and during the closing operation by way of the manipulation portion, the actuator is inserted into the safety switch after the lock portion engages with the fixing member.

2. The door lock apparatus with safety switch according to claim 1, wherein the actuator lock mechanism is pivotally moved in the different direction from the moving direction of the door when the manipulation portion is manipulated.

3. The door lock apparatus with safety switch according to claim 1, wherein the lock portion includes a coupling member which is pivotally moved about a pivotal shaft disposed at one end thereof in conjunction with the manipulation of the manipulation portion and which carries one end of the actuator on the other end thereof, and wherein the coupling member is pivotally moved to engage with the fixing member, thereby locking the door in the closed state.

4. The door lock apparatus with safety switch according to claim 3, wherein the actuator is pivotally supported by the other end of the coupling member.

5. The door lock apparatus with safety switch according to claim 4, wherein the manipulation portion is a pivotal member coupled with the pivotal shaft of the coupling member and the coupling member is pivotally moved in conjunction with the pivotal motion of the pivotal member.

6. The door lock apparatus with safety switch according to any one of claim 1, 2, 4 or 5, further comprising:

a casing which is disposed on the door and in which the actuator lock mechanism is accommodated by the opening operation by way of the manipulation portion; and a biasing member disposed in the casing for biasing the actuator lock mechanism in a move-in direction into the casing.

* * * * *